(12) United States Patent
Smith et al.

(10) Patent No.: US 10,196,291 B1
(45) Date of Patent: Feb. 5, 2019

(54) WASTEWATER TREATMENT

(71) Applicant: Adelante Consulting, Inc., Los Lunas, NM (US)

(72) Inventors: Virginia Lynne Smith, Los Lunas, NM (US); Charles Joseph English, Los Alamos, NM (US); Jennifer Leigh Pope, Santa Fe, NM (US)

(73) Assignee: Adelante Consulting, Inc., Los Lunas, NM (US)

( * ) Notice: Subject to any disclaimer, the term of this patent is extended or adjusted under 35 U.S.C. 154(b) by 128 days.

(21) Appl. No.: 15/261,358

(22) Filed: Sep. 9, 2016

Related U.S. Application Data (60) Provisional application No. 62/216,067, filed on Sep. 9, 2015.

(51) Int. Cl.
| | |
|---|---|
| *C02F 9/00* | (2006.01) |
| *C02F 3/30* | (2006.01) |
| *C02F 1/24* | (2006.01) |
| *C02F 1/52* | (2006.01) |
| *C02F 3/22* | (2006.01) |
| *B01D 21/00* | (2006.01) |
| *C02F 1/00* | (2006.01) |

(52) U.S. Cl.
CPC .............. *C02F 9/00* (2013.01); *B01D 21/003* (2013.01); *B01D 21/0018* (2013.01); *C02F 1/24* (2013.01); *C02F 1/52* (2013.01); *C02F 3/223* (2013.01); *C02F 2001/007* (2013.01); *C02F 2203/006* (2013.01)

(58) Field of Classification Search
CPC ........ C02F 2001/007; C02F 9/00; C02F 1/24; C02F 1/00; C02F 3/301; C02F 3/20; B01D 2311/04
See application file for complete search history.

(56) References Cited

U.S. PATENT DOCUMENTS

| | | | | |
|---|---|---|---|---|
| 2,886,175 A | * | 5/1959 | Kalinske | ................. C02F 3/205 210/194 |
| 3,565,797 A | * | 2/1971 | Gresham | ................. C02F 3/082 210/151 |
| 4,100,073 A | | 7/1978 | Hopcroft | |

(Continued)

FOREIGN PATENT DOCUMENTS

| | | |
|---|---|---|
| CA | 2164371 | 6/1996 |
| JP | 3985270 | 3/1997 |

(Continued)

OTHER PUBLICATIONS

CN104743742 (A)—Jul. 1, 2015, machine traslation and abstract).*

(Continued)

*Primary Examiner* — Ana M Fortuna
(74) *Attorney, Agent, or Firm* — Peacock Law P.C.; Justin R. Jackson; Deborah A. Peacock (57) ABSTRACT

Tertiary wastewater treatment wherein a tank is divided into a primary separation chamber, an aerobic chamber, and a clarifier chamber. Media are preferably disposed in the aerobic chamber and most preferably, the media can be contained in one or more porous containers. A recirculation path is preferably provided between the aerobic chamber and the primary separation chamber. In one embodiment, the recirculation between the two chambers can be powered by an air lift pump.

20 Claims, 12 Drawing Sheets

(56) References Cited

U.S. PATENT DOCUMENTS

| | | | | |
|---|---|---|---|---|
| 4,997,562 A * | 3/1991 | Warner | | B01D 21/0012 |
| | | | | 210/259 |
| 5,738,781 A | 4/1998 | Carlson | | |
| 5,766,454 A | 6/1998 | Cox et al. | | |
| 6,174,433 B1 * | 1/2001 | Futami | | C02F 1/725 |
| | | | | 210/195.3 |
| 6,287,469 B1 | 9/2001 | Ashburn et al. | | |
| 8,017,014 B2 * | 9/2011 | Yoon | | B01D 61/16 |
| | | | | 210/605 |
| 2002/0047500 A1 * | 4/2002 | Lai | | B06B 1/0622 |
| | | | | 310/334 |
| 2003/0121852 A1 * | 7/2003 | Katsu | | C02F 3/1268 |
| | | | | 210/609 |
| 2004/0211722 A1 * | 10/2004 | Lacey | | C02F 3/085 |
| | | | | 210/620 |
| 2005/0045557 A1 * | 3/2005 | Daigger | | C02F 3/1215 |
| | | | | 210/605 |
| 2005/0242044 A1 | 11/2005 | Couch | | |
| 2010/0264080 A1 * | 10/2010 | Livingston | | C02F 3/1273 |
| | | | | 210/605 |
| 2014/0332465 A1 * | 11/2014 | Kitagawa | | C02F 1/24 |
| | | | | 210/620 |
| 2016/0200608 A1 * | 7/2016 | Tharp | | C02F 3/12 |
| | | | | 210/620 |

FOREIGN PATENT DOCUMENTS

| | | |
|---|---|---|
| JP | 3008287 B1 | 2/2000 |
| JP | 2010247051 | 11/2010 |

OTHER PUBLICATIONS

CN202968313 U, Jun. 5, 2013 (abstract).*
CN104817229B,/15/2015 abstract.*
CN104817229B, Apr. 15, 2015 (abstract).*
Otowa, et al., "Perspectives of Upgraded Jokaso (Onsite Wastewater Treatment Unit) System in Australia", Paper presented at SWWS (AWA) conference in Newcastle, NSW, Australia, Aug. 13, 2014.

* cited by examiner

WASTEWATER TREATMENT

CROSS-REFERENCE TO RELATED APPLICATIONS

This application claims priority to and the benefit of the filing of U.S. Provisional Patent Application Ser. No. 62/216,067, entitled "Wastewater Treatment", filed on Sep. 9, 2015, and the specification thereof is incorporated herein by reference.

BACKGROUND OF THE INVENTION

Field of the Invention (Technical Field)

Embodiments of the present invention relate to a tertiary wastewater treatment method and apparatus, particularly to a tertiary wastewater treatment method and apparatus for residential wastewater. Embodiments of the present invention also relate to tertiary wastewater treatment which can optionally be disposed within a typical apparatus for containing such a process, and more particularly to a tertiary wastewater treatment that can be scaled to address various sizes of wastewater treatment and, optionally, reclamation.

DESCRIPTION OF RELATED ART

Conventional tertiary wastewater treatment systems employ complex filtration and/or growth systems to provide the desired treatment levels. These systems use a filter or growth media that eventually fail over the lifecycle of the system. Often the filtration media is inherent in the containing unit design. Most convention units require a complete replacement of the system since replacement or restoration of the media used is not economically feasible or physically possible once the media, filtration, or growth system is no longer functional. Units that do provide for removal of the filtration media often require full and costly replacement of the media material and a lengthy maturation process to reinstate the biological process.

BRIEF SUMMARY OF EMBODIMENTS OF THE PRESENT INVENTION

An embodiment of the present invention relates to a wastewater treatment apparatus having a tank—the tank having a primary physical separation chamber, an aerobic chamber, and a clarification chamber; and a recirculation loop that moves contents from the aerobic chamber to the primary physical separation chamber. The aerobic chamber preferably comprises media in a porous container disposed therein. The porous container preferably comprises a bag formed from a net. The recirculation loop preferably comprises an airlift pump. In one embodiment, the wastewater treatment apparatus does not comprise an anaerobic treatment chamber or tank. In one embodiment, an outlet of the primary physical separation chamber can be disposed below a surface of water within the primary physical separation chamber when the apparatus is actively treating the wastewater.

An embodiment of the present invention also relates to a wastewater treatment apparatus having a tank, the tank having two internal baffles to form a primary physical separation chamber, an aerobic chamber, and a clarification chamber; and the tank not having an anaerobic chamber. The baffles can extend all the way to a bottom of the tank such that each of the chambers are not open to one another along a lower portion thereof. In one embodiment, the tank can be formed from a concrete material. In one embodiment, the tank can comprises exactly three chambers.

In one embodiment the wastewater treatment apparatus can have three access ports, each of which can provide access to a corresponding one of the chambers. Optionally, media can be disposed within a porous container, which can include one or more bags formed from netting.

An embodiment of the present invention relates to a method for treating wastewater that includes passing the wastewater into a primary physical separation chamber; passing the wastewater from the primary physical separation chamber to an aerobic chamber; passing air up through the wastewater within the aerobic chamber; recirculating some of the wastewater from the aerobic chamber back to the primary physical separation chamber; and passing at least some of the wastewater from the aerobic chamber to a clarification chamber. In one embodiment, the method does not include passing the wastewater into an anaerobic chamber. Optionally, passing air up through the wastewater can include passing air up through a mixture of wastewater and media within the aerobic chamber. Passing the wastewater from the primary physical separation chamber to an aerobic chamber comprises passing the wastewater through an opening in a bulkhead of a tank, which can optionally be formed from a cementitious material, including concrete. In one embodiment, recirculating some of the wastewater can include recirculating some of the wastewater with an airlift pump. Optionally, passing at least some of the wastewater from the aerobic chamber to a clarification chamber can include passing at least some of the wastewater through an opening in a bulkhead of a tank.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

As used throughout this application, the terms "water" and/or "wastewater" are used for simplicity and are intended to include not only water but also sewage throughout its various stages of treatment.

Figure 1:
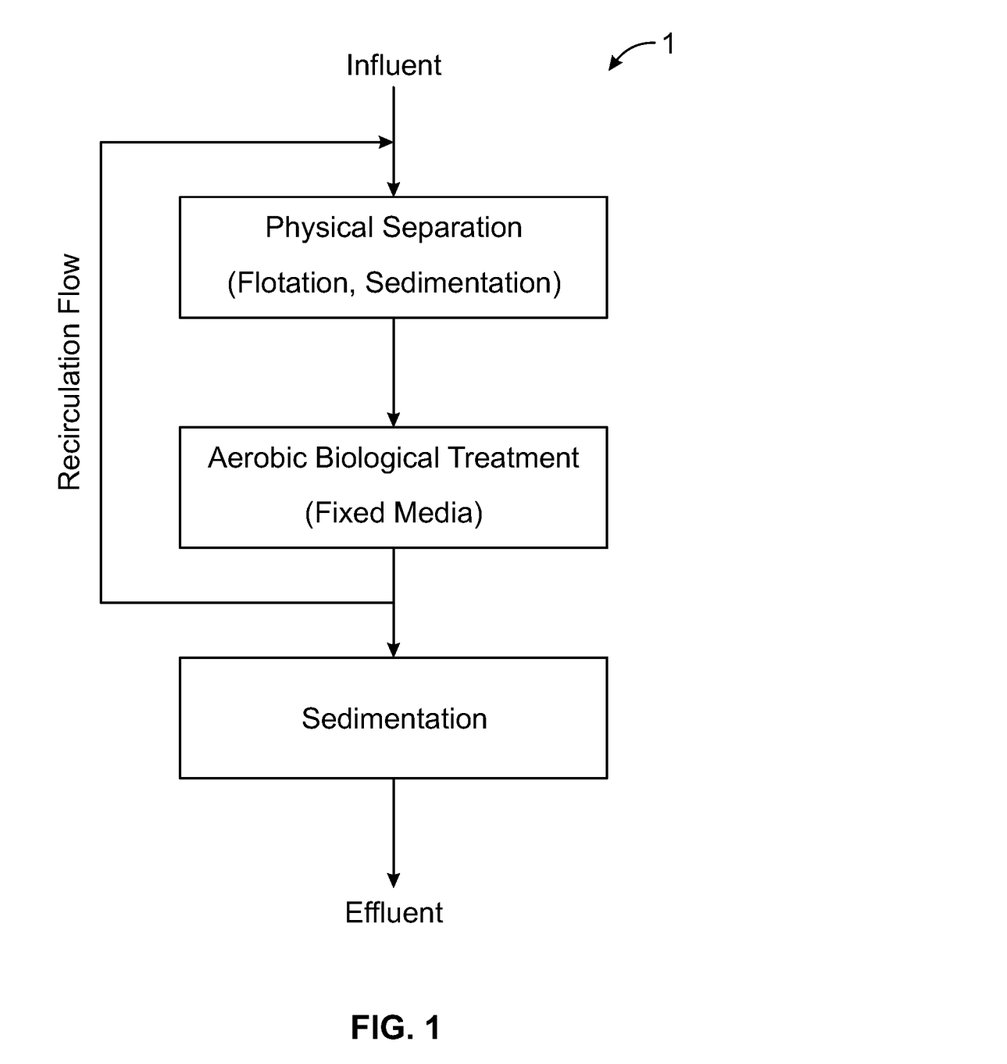
FIG. 1 is a flow diagram that illustrates an embodiment of the present invention.

Referring now to the drawings, an embodiment of the present invention relates to an advanced treatment unit ("ATU"), which is most preferably an integrated treatment system that employs one or more of the following treatment processes: physical separation (sedimentation and flotation); aerobic biological treatment with fixed media; biological denitrification; sedimentation; and/or disinfection. FIG. 1 is a flowchart which illustrates an overall function of tertiary wastewater treatment process 1 of an embodiment of the present invention. As illustrated therein, influent initially enters a settlement chamber so that physical separation can take place, then the influent enters an aerobic biological treatment chamber and a recirculation path is preferably provided that provides a flow path back to the physical separation chamber. Finally the influent enters a sedimentation chamber and after being allowed time to settle, the treated effluent exits the system.

Figure 2:
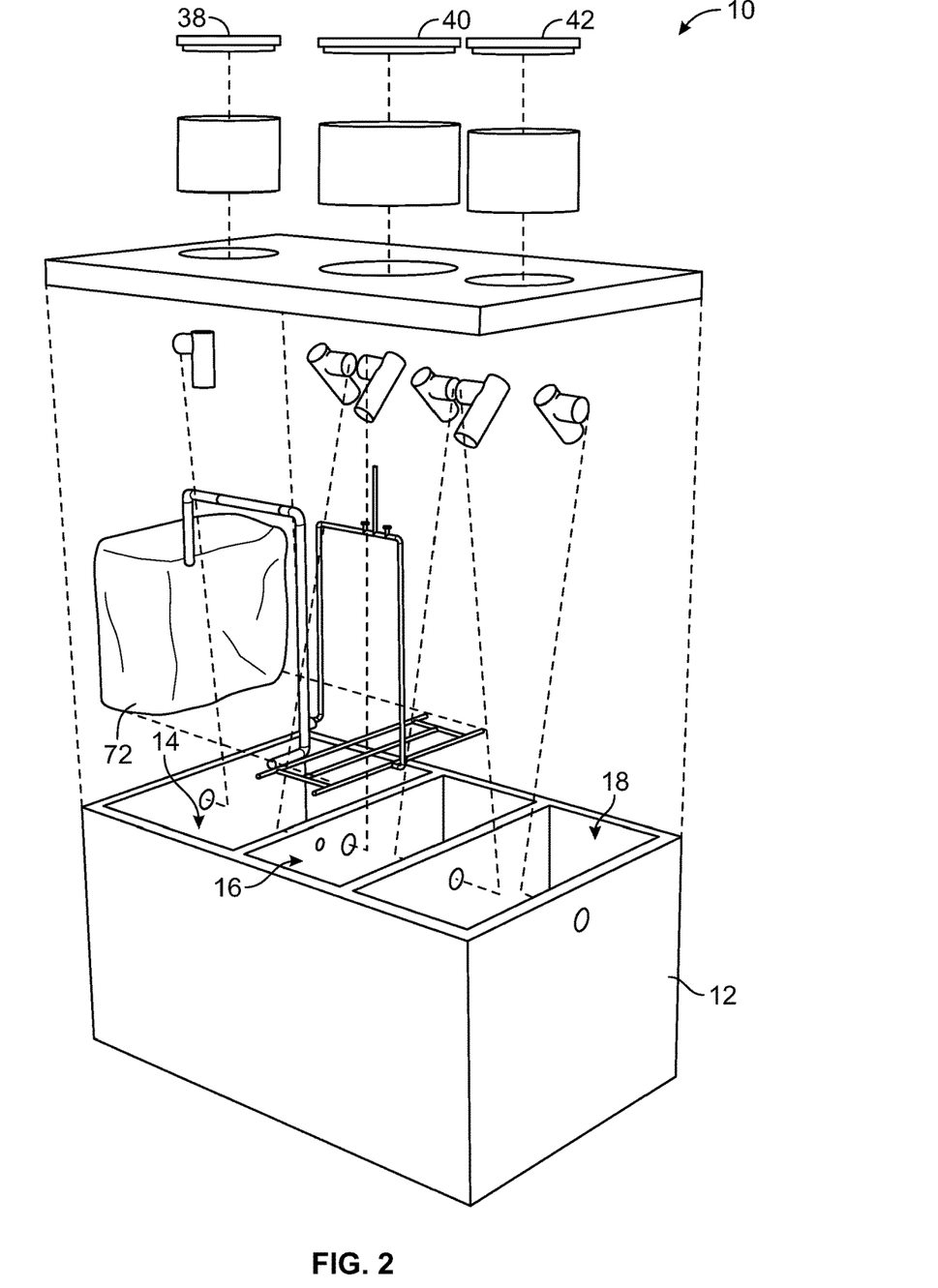
FIG. 2 is an exploded-view drawing of an embodiment of the present invention.
Figure 3:
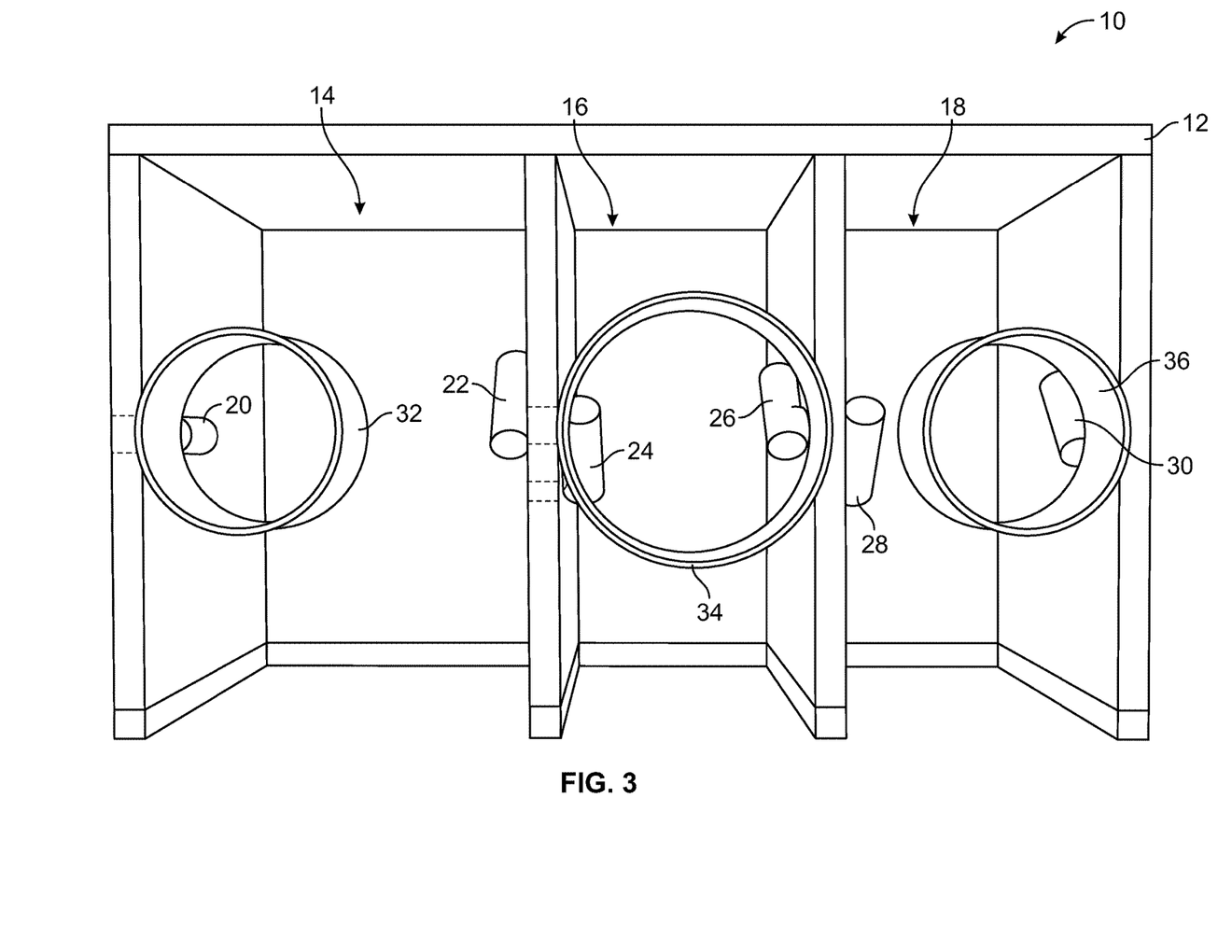
FIG. 3 is a plan view of a treatment tank, with a side-wall cut-away, of an embodiment of the present invention illustrating the layout of the three treatment chambers, with inlets, outlets, and access ports.
Figure 4:
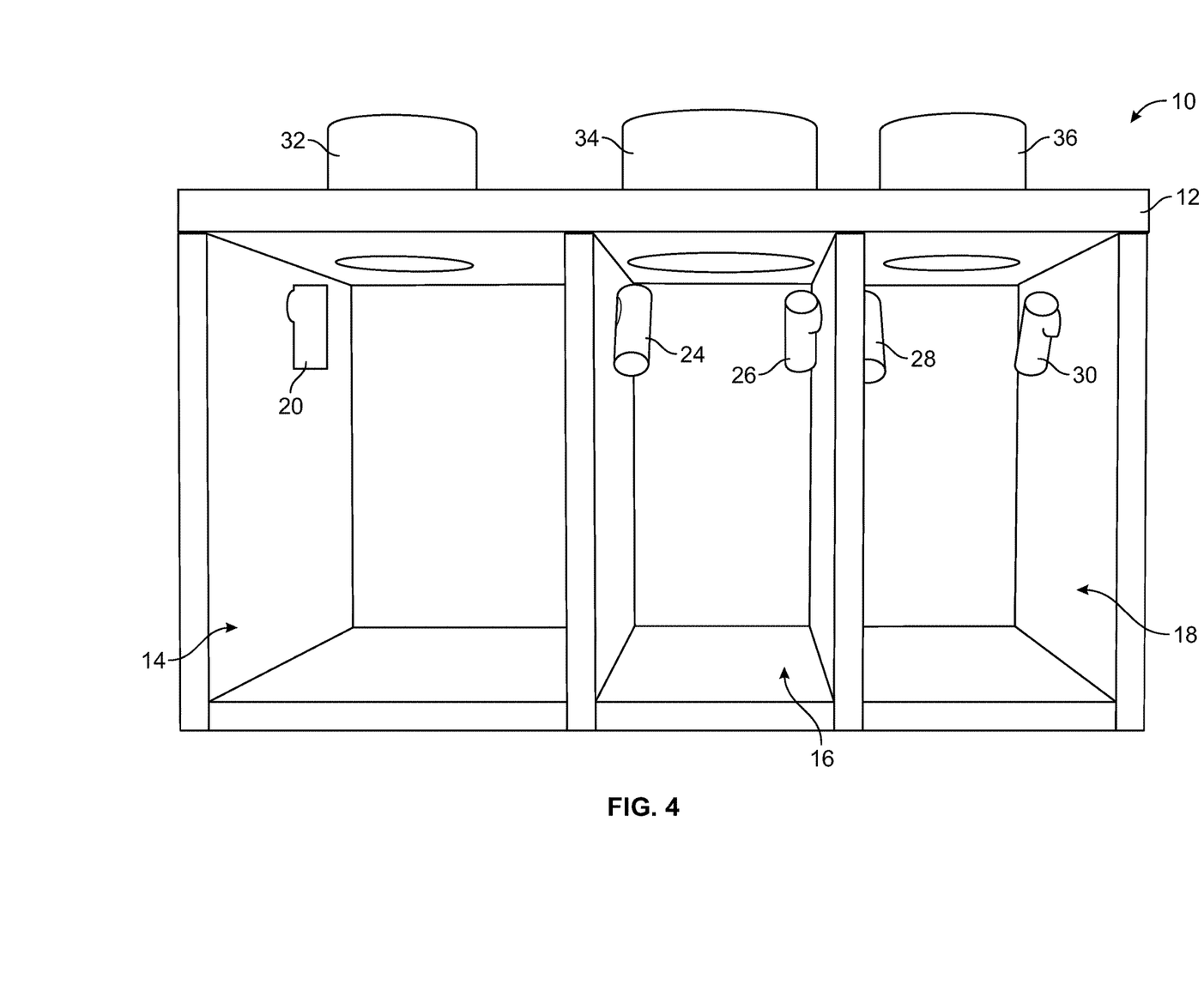
FIG. 4 is a front perspective view of a treatment tank with a front wall portion removed to illustrate the layout of the three treatment chambers, bulkheads, inlets and outlets of an embodiment of the present invention.
Figure 5:
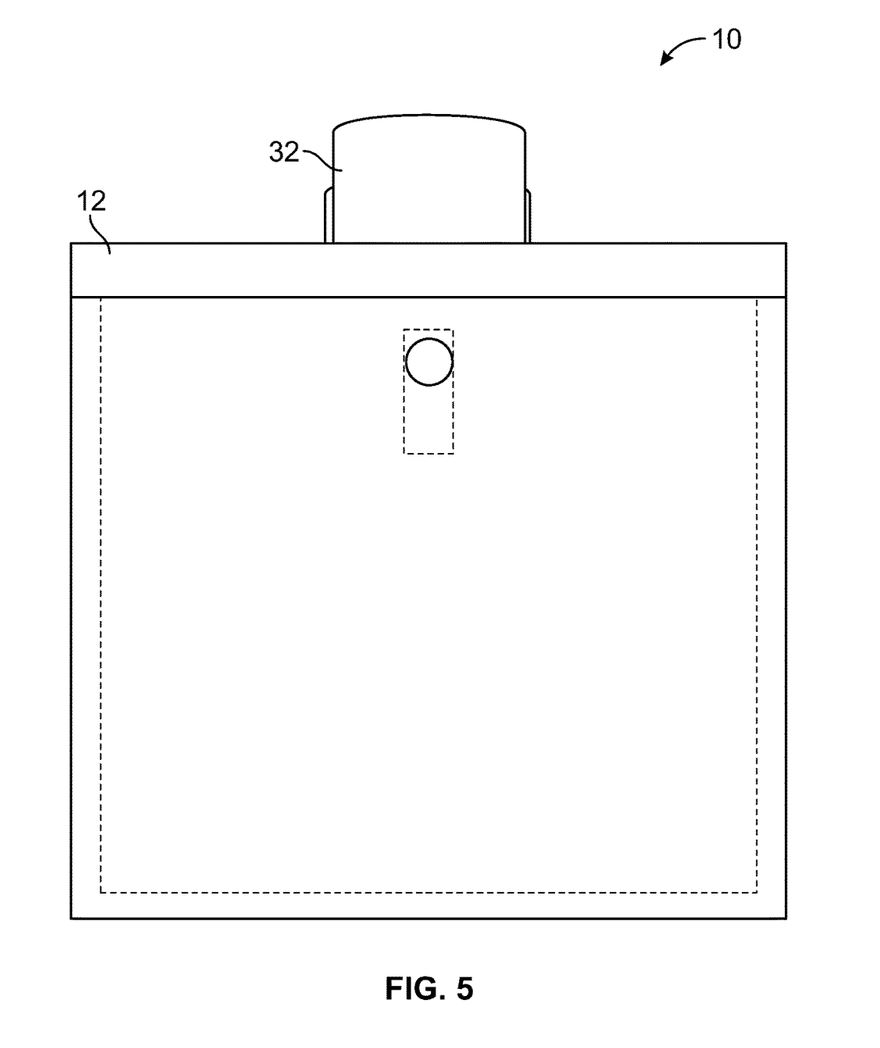
FIGS. 5 and 6 are respectively left and right end-views of a tank according to an embodiment of the present invention.
Figure 6:
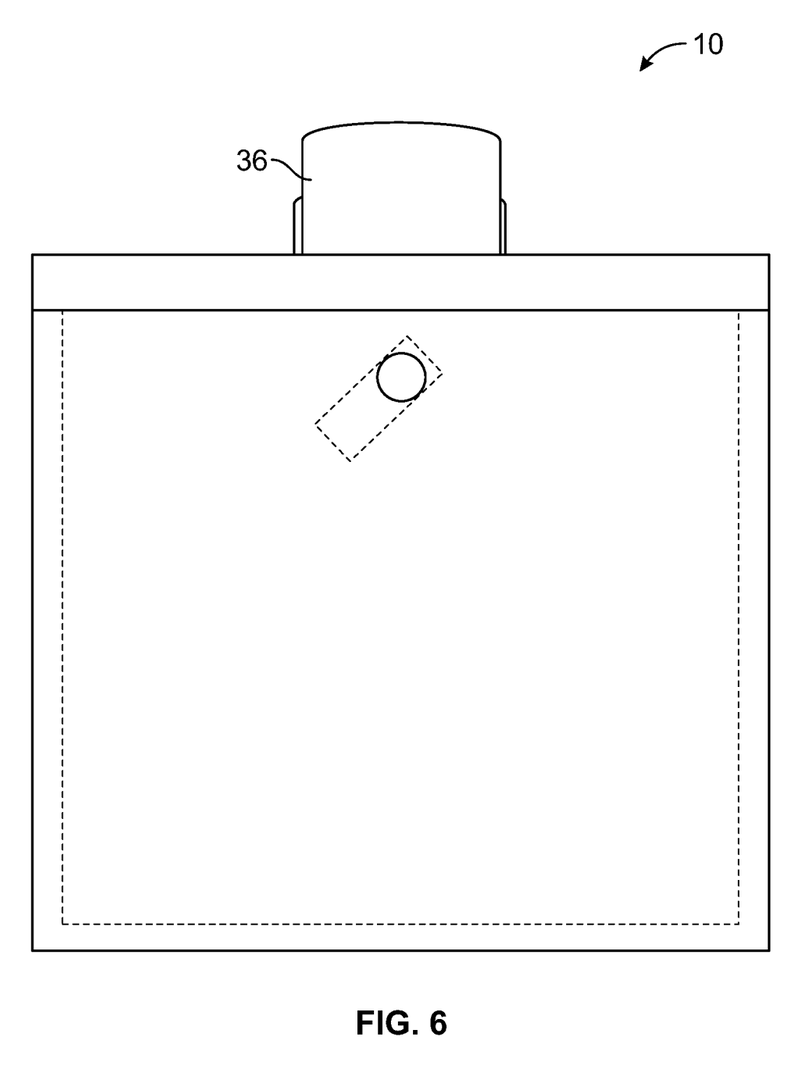

In one embodiment, treatment unit 10 having wastewater treatment tank 12, that is preferably formed into three chambers, primary physical separation chamber 14, aerobic chamber 16, and clarifier sedimentation chamber 18. In one embodiment, influent preferably enters unit 10 through inlet 20 into primary physical separation chamber 14. In one embodiment, inlet 20 is preferably oriented such that the influent is traveling substantially vertically downward when it enters separation chamber 14, after dwelling in separation chamber 14, the water exits separation chamber 14 by passing through outlet 22 and into inlet 24 of aerobic chamber 16 where it is preferably aerated and allowed to contact media 70 which is most preferably contained within porous container 72. Some of the water within aerobic chamber 16 is pumped via airlift pump 62 back into primary physical separation chamber 14 and some water flows through outlet 26 of aerobic chamber 16 and into inlet 28 of clarification chamber 18. After dwelling within clarification chamber 18, the water preferably exits tank 12 by passing through outlet 30 where it emerges as effluent of treatment unit 10.

Primary physical separation chamber 14 of tank 12 preferably has a volumetric size selected to permit the expected average flow of influent to dwell within separation chamber 14 long enough to permit a substantial amount of the constituents that are lighter than water to float to the top and to permit a substantial amount of the constituents that are heavier than water to settle to the bottom.

Design Loadings and Concentrations.

The descriptions of the processes contain specifications, such as loading rates. The evaluation of process performance is based on a minimum design flow rate of 400 gal/day. The process specifications are based on design mass loadings of waste constituents equal to the mid-range of data presented in the 2002 Environmental Protection Agency (EPA) Onsite Wastewater Treatment Systems Manual. These loadings, and the resulting concentrations assuming 6 persons and 75 gal/capita-day are summarized in table 1.

TABLE 1

| Constituent | Mass Loading, g/cap-day | Total Design Loading, g/day | Concentration, mg/L |
|---|---|---|---|
| Total Solids (TS) | 160 | 960 | 560 |
| Total Suspended Solids (TSS) | 55 | 330 | 190 |
| 5-Day Biochemical Oxygen Demand (BOD5) | 50 | 300 | 180 |
| Chemical Oxygen Demand (COD) | 130 | 780 | 460 |
| Total Nitrogen (TN) | 12 | 72 | 42 |
| Fats, Oil, and Grease (FOG) | 15 | 90 | 53 |

Physical Separation

Figure 7:
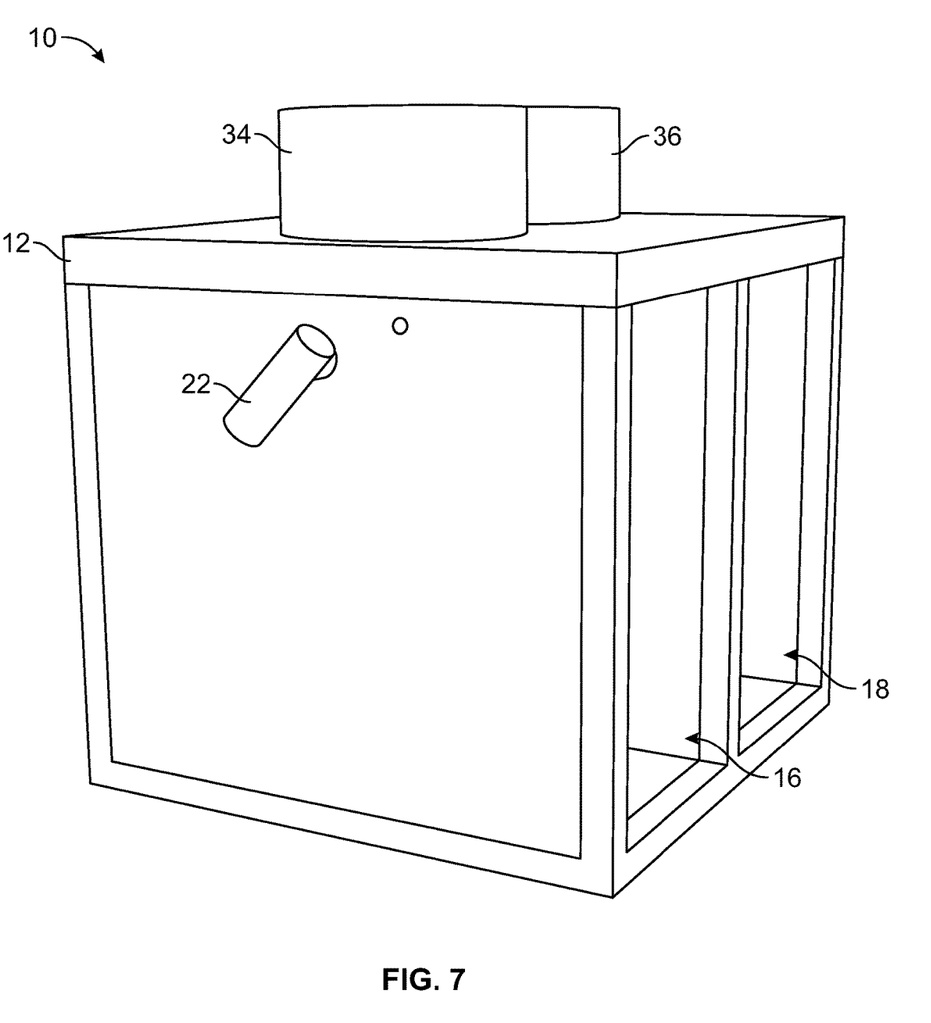
FIG. 7 is an elevated perspective sectional view drawing of an embodiment of the present invention to illustrate an outlet of the primary physical separation chamber as well as the opening in a bulkhead of the tank through which ("a" or "the") pipe for a recirculation path can pass.

Physical separation of at least a significant portion of floatable and sinkable solids in the influent wastewater occurs in primary separation chamber 14. In one embodiment, inflow into the first chamber flows through inlet 20, which is preferably formed from a "tee" fitting that passes through an exterior wall of tank 12. In this embodiment, inlet 20 preferably directs the flow downward to prevent short-circuiting. In one embodiment, primary physical separation chamber 14 is preferably sized to provide a hydraulic retention time of approximately 16 hours to 24 hours based on a design wastewater flow rate. Separation chamber 14 is also preferably sized to provide an overflow rate of no more than about 200 gal/ft$^2$-day at a design flow rate and maximum recirculation rate. Settleable solids are allowed to settle much as they would in a conventional septic tank. In one embodiment, outlet 22 is preferably submerged within the contents of chamber 14 during typical operation of unit 10. In one embodiment, outlet 22 is preferably configured to include a scum baffle (or baffles) to prevent transfer of scum and floatable solids to the next chamber. In one embodiment, outlet 22 with scum baffle is provided by use of a "tee" fitting that passes through a bulkhead of tank 12 which separates separation chamber 14 from aerobic chamber 16. Preferably, outlet 22, includes a pipe that extends down into separation chamber 14 to provide a submerged outlet. This separation between an opening of outlet 22 and the waterline provides adequate volume for storage of floatable solids. Sludge and scum are periodically removed from separation chamber 14 through vacuuming in the same manner as with a conventional septic tank. Outlet 22 is preferably submerged enough to allow fats, oil, grease and other floatable solids to accumulate on the surface for at least one year without breakthrough to the second chamber. The distance from the bottom of separation chamber 14 to an opening of outlet 22 is also preferably sufficient so that the opening of outlet 22 remains at least about 6 inches above the top of the settled solids that accumulate in the primary physical separation chamber 14.

Aerobic Treatment

Figure 10:
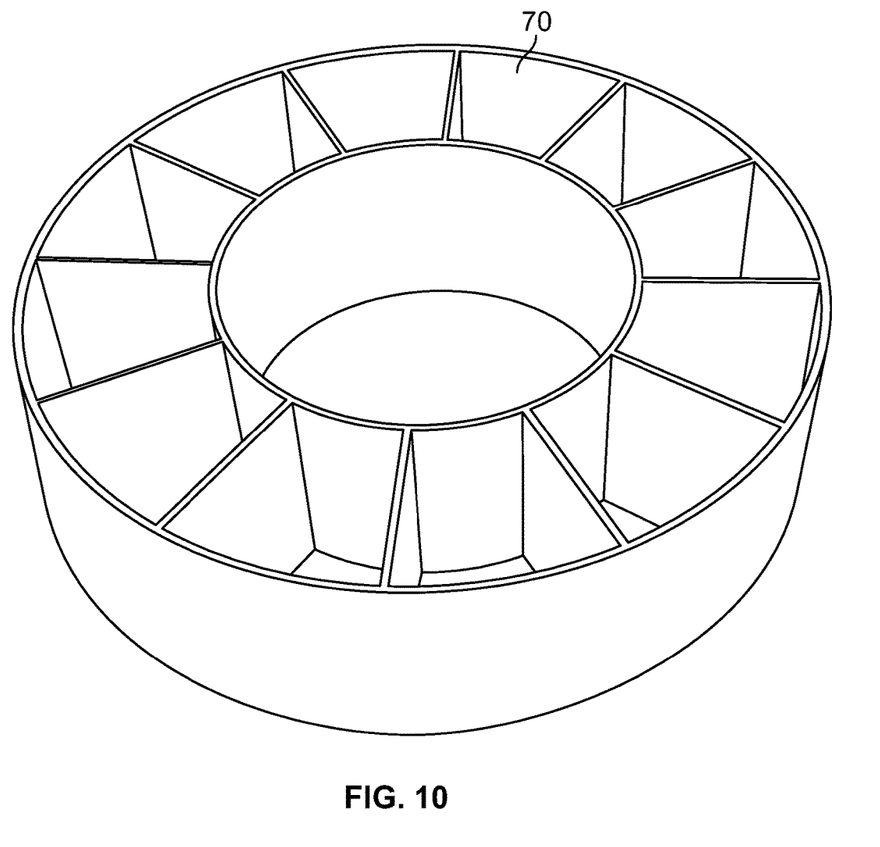
FIG. 10 illustrates a single piece of aerobic treatment media that is preferably used in one embodiment of the present invention.
Figure 11:
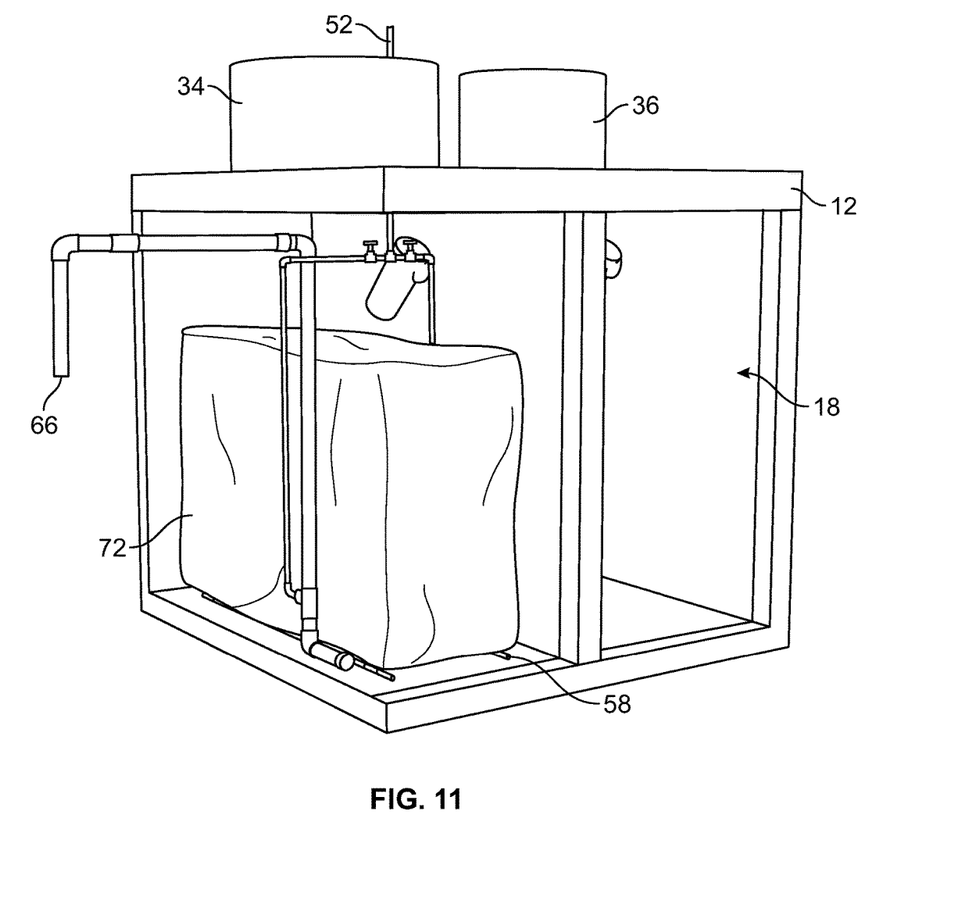
FIG. 11 illustrates placement of the aerobic media within the aerobic treatment chamber in one embodiment of the present invention.

Aerobic, attached growth, biological treatment preferably occurs in aerobic chamber 16 of tank 12. Effluent from separation chamber 14 preferably flows through the attached-growth media 70, which is most preferably disposed inside of porous container 72, allowing contact of the bacteria attached to media 70 with dissolved carbon and nitrogen in the wastewater. Media 70 is most preferably used in bulk—an individual component of which is illustrated as media 70. Media 70 is preferably formed from a plastic material, and provides a substrate upon which aerobic bacteria can attach and grow. Although media 70 is illustrated in FIG. 10 as comprising a particular shape, media of virtually any shaped and be used and will provide desirable result. The media shape illustrated in FIG. 10 is merely a most preferred media shape. Although porous container 72, which holds media 70, is not essential to the operation of the invention, porous container 72 is most preferably a bag that is formed form a mesh or netting-type material and is most preferably formed from netting conventionally used for oyster netting. By disposing media 70 within porous container 72, a user can easily remove all of media 70 by simply removing porous container 72. In conventional aerobic chambers wherein media is used, a user must scoop out each and every piece of media in order to wash or replace the media. Porous container 72 thus provides a much simpler and expeditious way to replace media 70. Aerobic chamber 16 and media 70 are preferably designed and/or selected to provide sufficient biomass to oxidize the organic carbon and organic/ammonical nitrogen in the wastewater. The media most preferably has a specific surface area of at least about 120 $ft^2/ft^3$ and aerobic chamber 16 is preferably sized to provide sufficient media to provide a surface area of about 7.5 $ft^2$ to about 12.5 $ft^2$ per gal/day of inflow. In one embodiment, media 70 can be cylindrically-shaped with internal fins, made of polypropylene, and have a specific surface area of about 152 $ft^2/ft^3$ and a void ratio of about 0.92.

To achieve tertiary treatment (i.e., nitrogen removal), sufficient biomass is preferably present so that organic carbon can be oxidized, thereby creating conditions for nitrifying bacteria to oxidize organic/ammonical nitrogen. Aerobic chamber 16 is preferably sized so that the organic loading (based on 5-day biochemical oxygen demand ["$BOD_5$"]), does not exceed about 0.2 g $BOD_5$ per square ft of media. In one embodiment, porous container 72 is made small so that a plurality of porous containers 72 are used in a single aerobic chamber 16. For example, in one embodiment, each porous container 72 preferably contains about 1 $ft^3$ of media 70. In other embodiments, media 70 can be placed in a porous container that is not a bag, or it can be placed directly into aerobic chamber 16 loosely (i.e., without disposing it into porous container 72 or any other porous container).

Figure 8:
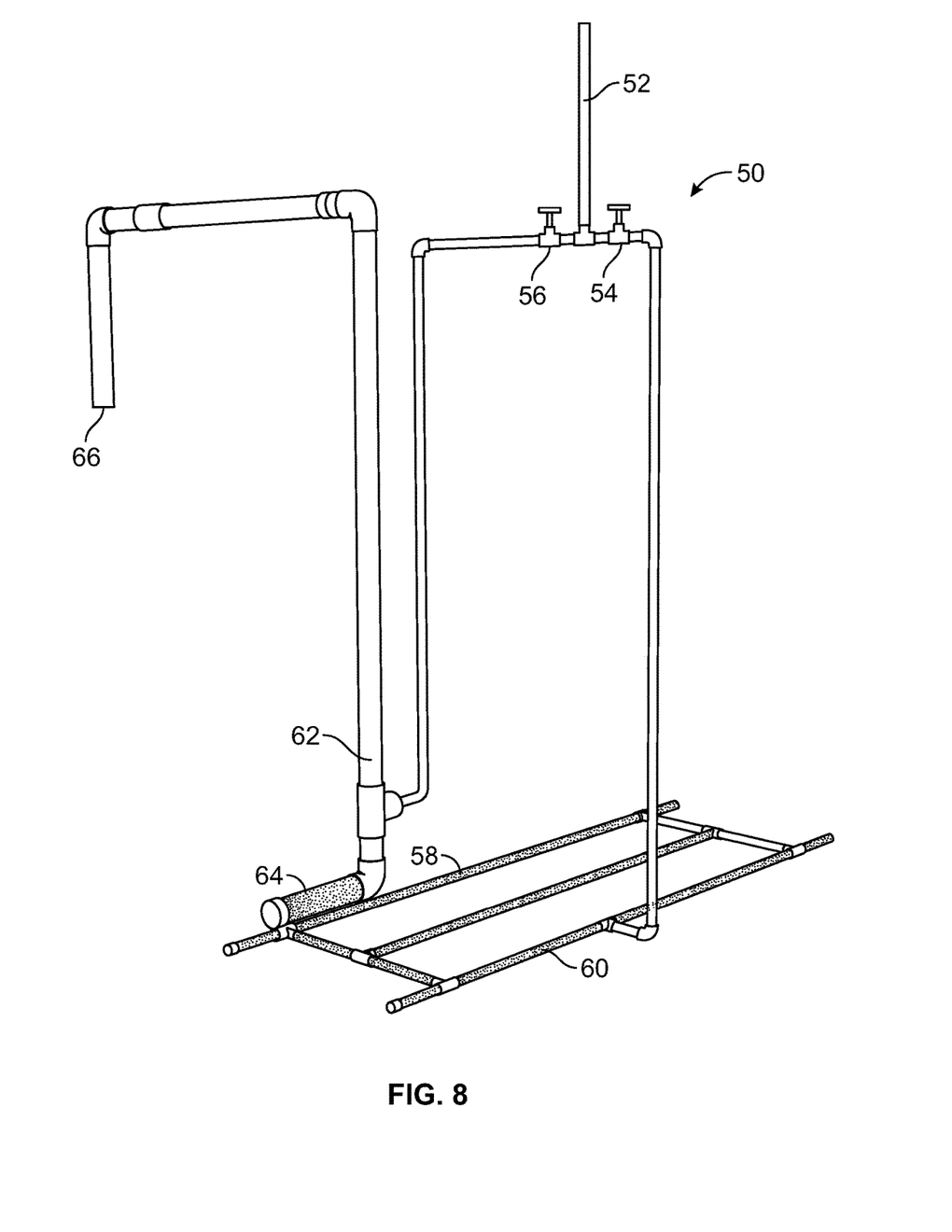
FIG. 8 is a drawing which illustrates aeration piping, air sparger, and air-lift pump used in an embodiment of the present invention.
Figure 9:
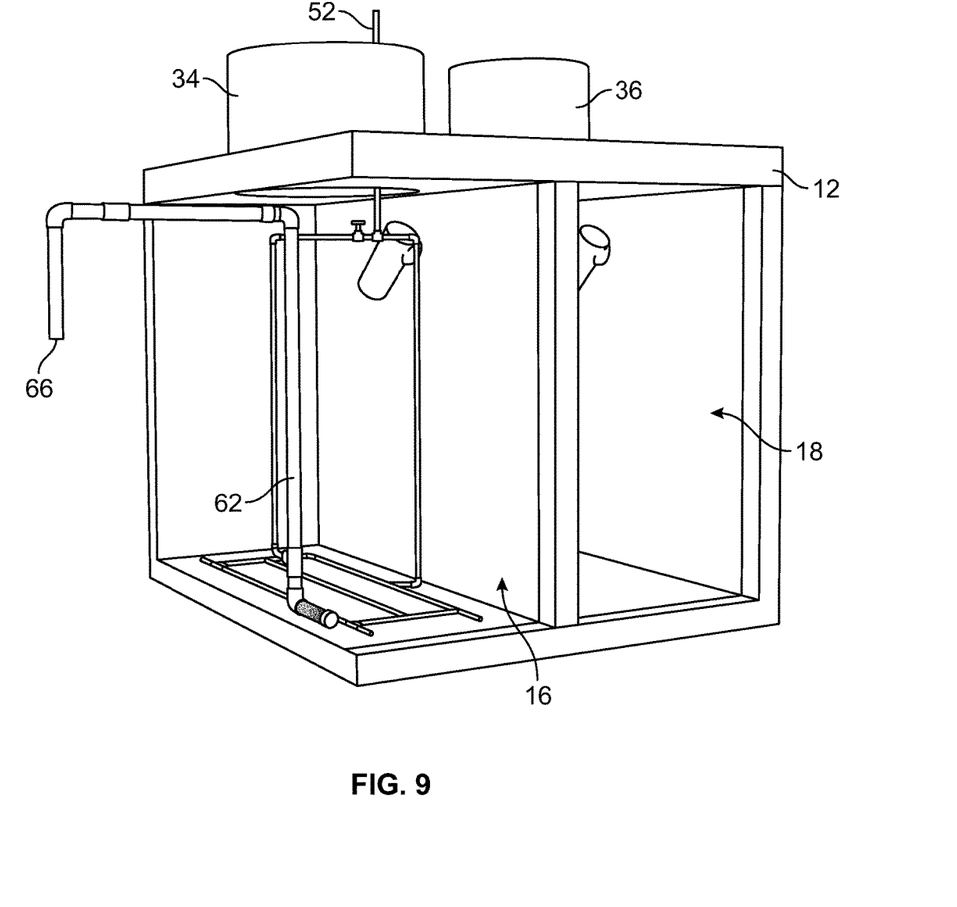
FIG. 9 is a drawing which illustrates a cut-away view of a tank to illustrate placement of the aeration piping, air sparger, and air-lift pump within the aerobic treatment chamber, as used in an embodiment of the present invention.

Oxygen is preferably provided to the aerobic bacteria attached to media 70 in aerobic chamber 16. Oxygen is preferably provided by directing air into inlet 52. Valve 54, which can be a manual valve or an electrically-controlled solenoid valve, preferably turns on and off the flow of air to spargers 58, which most preferably comprise a plurality of small openings 60. Oxygen is thus provided by air bubbles that are emitted from openings 60 of sparger 58. In one embodiment, sparger 58 can be formed from a plurality of spargers disposed below media 70. In one embodiment, sparger 58 includes a plastic pipe having perforations through which air can flow. In other embodiments, sparger 58 can be formed from one or more porous diffusers. In one embodiment, air is injected through the sparger 58 using an air blower capable of delivering at least about 0.2 L/min of air flow from sparger 58 at standard temperature and pressure for each gal/day of wastewater inflow. Optionally, air can be provided by an electrically-powered diaphragm-type blower, a compressor, or any other source capable of producing a flow of air with sufficient volume and pressure to accomplish a desired output for a particular application. Sparger 58 and the air source are preferably sized to provide sufficient air flow to maintain a dissolved oxygen concentration of up to about 4 mg/L in the second chamber. The rate of air flow to sparger 58 can optionally be controlled using valve 54.

Biological Denitrification

Most of the effluent from aerobic chamber 16 is preferably recirculated to primary separation chamber 14. Most preferably via air-lift pump 62 disposed in aerobic chamber 16. Valve 56, which can be manually activated or which can optionally be an electrically or pneumatically-operated solenoid valve preferably turns on and off a flow of air to airlift pump 62. In this embodiment, liquid from aerobic chamber 16 preferably enters airlift pump 62 through one or more openings 64. Then air, which enters a lower end of airlift pump 62, rises up through airlift pump 62 and carries with it a flow of water which is drawn in through inlet 64, that can optionally have a filter or screen attached thereto to prevent entry of solids of a size which exceeds the opening size of the filter or screen. The water preferably exits airlift pump 62 at outlet 66, which is preferably disposed in primary separation chamber 14. The primary purpose of the recirculation is to create a flow of wastewater through the treatment unit, thereby creating more stable operating conditions. A secondary purpose is to remove nitrogen from the wastewater by biological denitrification. Within aerobic chamber 16, reduced, organic and ammonical nitrogen in the effluent from primary separation chamber 14 is oxidized to nitrate by nitrifying bacteria attached to the media. This nitrate-containing wastewater is preferably recirculated back to primary separation chamber 14 which contains dissolved organic carbon to act as an electron donor. The recirculation rate is preferably configured such that the dissolved organic carbon in primary separation chamber 14 exceeds the dissolved oxygen provided by the recirculated water. The dissolved carbon is preferably oxidized using oxygen as the electron acceptor until the dissolved oxygen is depleted sufficiently within primary separation chamber 14 to create anoxic conditions, at which time denitrifying bacteria oxidize dissolved organic carbon using nitrate as the electron acceptor. The steady flow of recirculated water and organic carbon present in the influent waste creates an anoxic zone within the first chamber where denitrification occurs.

In one embodiment, one or both of valves 56 and/or 54 can be omitted. In this embodiment, its corresponding circuit is activated and deactivated simply by activating and deactivating the blower or other air source that is connected to inlet 52.

Airlift pumping is preferably achieved by injecting air into airlift pump 62 within aerobic chamber 16. In one embodiment, air is provided using the same blower as used for aeration of the aerobic media. In an alternative embodiment, however, a separate blower or other air source can be used to power each of sparger 58 and airlift pump 62. The recirculation rate can optionally be controlled by controlling the flow of air injected into airlift pump 62.

Sedimentation

Figure 12:
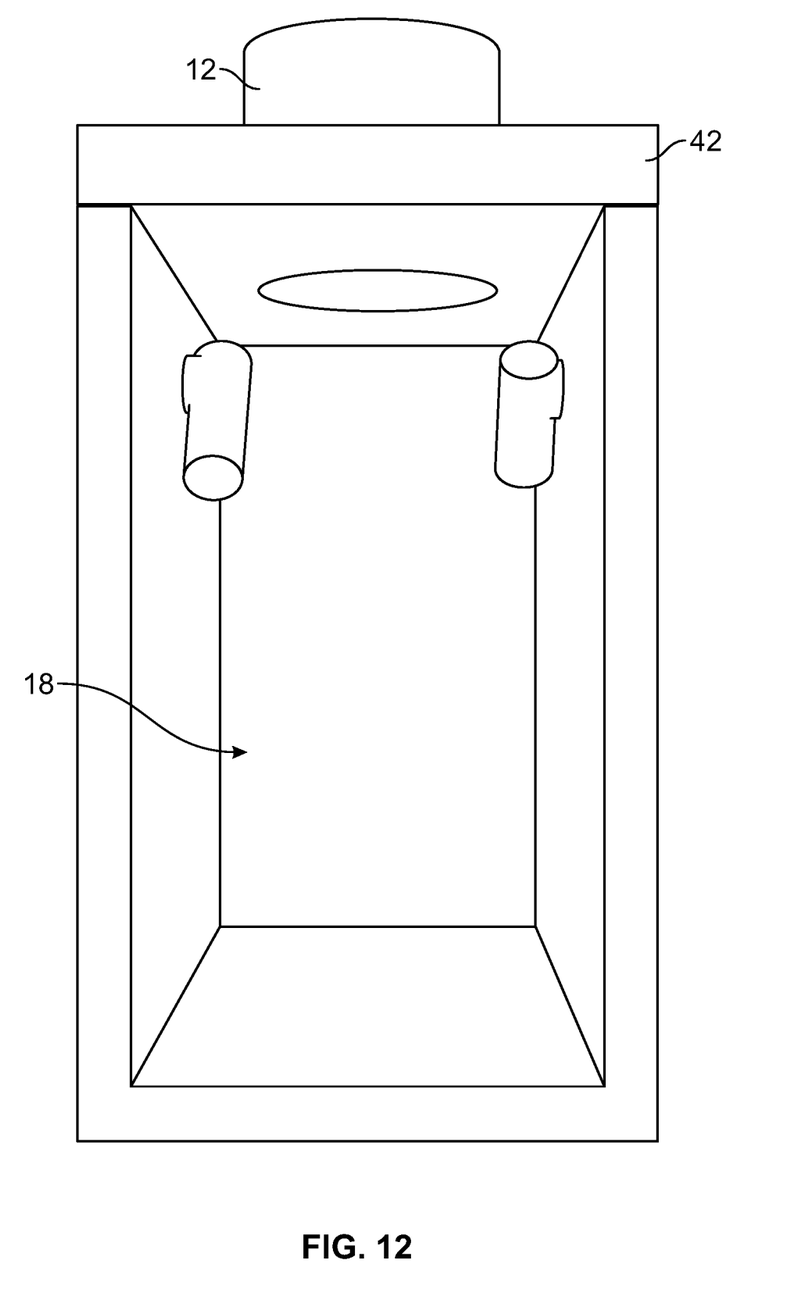
FIG. 12 is a front view of only the clarification chamber with a front wall of the tank removed to illustrate preferred placement of inlets and outlets thereof.

The clarification chamber 18 of tank 12 preferably provides clarification of the effluent from aerobic chamber 16. Effluent from aerobic chamber 16 enters outlet 26, which is preferably positioned such that its opening is submerged beneath the surface of the contents of aerobic chamber 16. The effluent from aerobic chamber 16 then preferably enters clarification chamber 18 through inlet 28. In one embodiment, outlet 26 preferably comprises a "tee" fitting passing through the bulkhead of tank 12 between aerobic chamber 16 and clarification chamber 18 with a pipe extending down into clarification chamber 18 to provide inlet 28, which most preferably comprises an opening that is disposed below a surface of the contents of clarification chamber 18. Outlet 30 of clarification chamber 18 preferably comprises a "tee" fitting that passes through an exterior wall of tank 12. In one embodiment, inlet 28 and outlet 30 are preferably disposed in at least slightly opposing directions from one another to encourage mixing and flocculation of solids in clarification chamber 18. Clarification chamber 18 preferably provides an opportunity for the contents thereof to clarify via flocculation and sedimentation. In one embodiment, clarification chamber 18 is preferably sized to provide an overflow rate of approximately 30 gal/ft$^2$-day to 50 gal/ft$^2$-day based on the design flow rate.

In one embodiment, tank 12 is preferably cast from reinforced concrete with two internal concrete bulkheads, thus creating each of chambers 14, 16, and 18.

In one embodiment, each of chambers 14, 16, and 18, preferably comprise a respective access port 32, 34, and 36, and a respective cover 38, 40, and 42. In one embodiment, one or more of access ports 32, 34, and/or 36 preferably comprise a riser pipe or collar that extends vertically above tank 12. In one embodiment, all or a portion of tank 12 can be buried below ground level and access ports 32, 34, and/or 36 are preferably extended above tank 12 via their respective riser pipe or collar so that covers 38, 40, and/or 42 are positioned at or slightly above ground level. In one embodiment, one or more of the access ports are preferably at least about 8 inches in diameter to about 36 inches in diameter. In one embodiment access ports 32 and 36 are smaller in diameter than access port 38. Access port 32, preferably provides access to primary physical separation chamber 14, access port 34, preferably provides access to aerobic chamber 16, and access port 36, preferably provides access to clarification chamber 18. In one embodiment, access port 34 is preferably sized such that each of porous containers 72, if used, can fit through it.

In one embodiment, tank 12 can be formed from a material other than concrete, including but not limited to plastic, fiberglass, stainless steel, aluminum, a rubber material, combinations thereof and the like. In one embodiment, the tank does not include an anaerobic treatment chamber. In one embodiment, the baffles of tank 12 that separate chambers 14, 16, and 18 preferably extend all the way to the bottom of tank 12 such that chambers 14, 16, and 18 are not open to one another at or near their bottom.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A wastewater treatment apparatus comprising:
    a tank, said tank comprising:
        a primary physical separation chamber;
        an aerobic chamber; and
        a clarification chamber;
    a recirculation loop that moves contents from said aerobic chamber to said primary physical separation chamber;
    an outlet of said aerobic chamber coupled to an inlet of said clarification chamber;
    a porous container disposed in said aerobic chamber;
    media disposed within said porous container; and
    said wastewater treatment apparatus not comprising an anaerobic treatment chamber.

2. The wastewater treatment apparatus of claim 1 wherein said recirculation loop comprises an airlift pump.

3. The wastewater treatment apparatus of claim 1 wherein an outlet of said primary physical separation chamber is disposed at a location that is below a surface of water within said primary physical separation chamber.

4. The wastewater treatment apparatus of claim 1 wherein said porous container comprises one or more bags formed from a net.

5. The wastewater treatment apparatus of claim 1 wherein said media comprises a specific area of at least 120 square feet per cubic foot.

6. The wastewater treatment apparatus of claim 1 wherein said outlet of said primary physical separation chamber is tilted with respect to a side of said tank.

7. A wastewater treatment apparatus comprising:
    a tank, said tank comprising:
        a primary physical separation chamber,
        an aerobic chamber, and
        a clarification chamber, comprising baffles disposed between said chambers;
    said tank not comprising an anaerobic chamber;
    an outlet of said aerobic chamber coupled to an inlet of said clarification chamber; and
    a porous container disposed in said aerobic chamber; and media disposed within said porous container.

8. The wastewater treatment apparatus of claim 7 wherein said baffles extend all the way to a bottom of said tank such that each of said chambers is not open to one another along a lower portion of said chambers.

9. The wastewater treatment apparatus of claim 7 wherein said tank is formed from a concrete material.

10. The wastewater treatment apparatus of claim 7 wherein said tank comprises exactly three chambers.

11. The wastewater treatment apparatus of claim 7 further comprising three access ports, each of said access ports providing access to a corresponding one of said chambers.

12. The wastewater treatment apparatus of claim 7 wherein said porous container comprises one or more bags formed from netting.

13. The wastewater treatment apparatus of claim 7 wherein said media comprises a specific area of at least 120 square feet per cubic foot.

14. The wastewater treatment apparatus of claim 7 wherein said media comprises internal fins.

15. A method for treating wastewater comprising:
    passing the wastewater into a primary physical separation chamber;
    passing the wastewater from the primary physical separation chamber to an aerobic chamber;

passing the wastewater through a porous container disposed in the aerobic chamber;

passing the wastewater through media disposed in the porous container;

passing air up through the wastewater within the aerobic chamber;

recirculating some of the wastewater from the aerobic chamber back to the primary physical separation chamber; and passing at least some of the wastewater from the aerobic chamber to a clarification chamber; and not passing the wastewater into an anaerobic treatment chamber.

16. The method of claim 15 wherein passing air up through the wastewater comprises passing air up through a mixture of wastewater and media within the aerobic chamber.

17. The method of claim 15 wherein passing the wastewater from the primary physical separation chamber to an aerobic chamber comprises passing the wastewater through an opening in a bulkhead of a tank.

18. The method of claim 17 wherein passing the wastewater through an opening in a bulkhead of a tank comprises passing the wastewater through an opening in a bulkhead of a concrete tank.

19. The method of claim 15 wherein recirculating some of the wastewater comprises recirculating some of the wastewater with an airlift pump that is configured to draw water from the aerobic chamber and discharge it into the primary physical separation chamber by the injection of air into a lower portion of the airlift pump.

20. The method of claim 15 wherein passing at least some of the wastewater from the aerobic chamber to a clarification chamber comprises passing at least some of the wastewater through an opening in a bulkhead of a tank.

* * * * *